United States Patent
Yeh et al.

(10) Patent No.: US 12,212,697 B2
(45) Date of Patent: Jan. 28, 2025

(54) DEVICE AND METHOD FOR SECURING AND VERIFYING BUSINESS DATA VIA A BLOCKCHAIN SYSTEM

(71) Applicant: Wei Yeh, Taipei (TW)

(72) Inventors: Wei Yeh, Taipei (TW); Chao-Chiu Huang, Taipei (TW)

(73) Assignee: Wei Yeh, Taipei (TW)

( * ) Notice: Subject to any disclaimer, the term of this patent is extended or adjusted under 35 U.S.C. 154(b) by 317 days.

(21) Appl. No.: 17/813,087

(22) Filed: Jul. 18, 2022

(65) Prior Publication Data

US 2024/0022440 A1    Jan. 18, 2024

(51) Int. Cl.
*H04L 9/00* (2022.01)
*G06F 21/60* (2013.01)
(Continued)

(52) U.S. Cl.
CPC .............. *H04L 9/50* (2022.05); *G06F 21/602* (2013.01); *H04L 9/0825* (2013.01); *H04L 9/3239* (2013.01)

(58) Field of Classification Search
CPC ....... H04L 9/50; H04L 9/0825; H04L 9/3239; H04L 9/3263; G06F 21/602; G06F 21/64
See application file for complete search history.

(56) References Cited

U.S. PATENT DOCUMENTS 10,423,938 B1    9/2019 Gaeta et al.
2018/0123779 A1    5/2018 Zhang
(Continued)

FOREIGN PATENT DOCUMENTS

AU    2018100149 A4    3/2018
CN    106022741 A    10/2016
(Continued)

OTHER PUBLICATIONS

Di Francesco Maesa, Damiano; et al, "Blockchain Based Access Control Services", 2018 IEEE International Conference on Internet of things (IThings) and IEEE Green Computing and Communications (Greencom) and IEEE Cyber, Physical and Social Computing (CPSCOM) and IEEE Smart Data (Smartdata), IEEE, Jul. 30, 2018 (Jul. 30, 2018), pp. 1379-1386, XP033556170, DOI: 10.1109/CYBERMATICS_2018.2018.00237, section C.

*Primary Examiner* — Vu V Tran
(74) *Attorney, Agent, or Firm* — Skaar Ulbrich Macari, P.A.

(57) ABSTRACT

In a blockchain system, a user device obtains an address of a smart contract according to a transaction hash, and generates a private data hash according to business data. The user device then generates a transaction based on the private data hash and the address of the smart contract, and submits the transaction to the blockchain system to store the private data hash into the smart contract, such that confidential information of a business deal in the real world is secured. An authentication device generates a private data hash according to business data, obtains an address of a smart contract in the blockchain system according to a transaction hash, and accesses the smart contract via the address to determine whether the private data hash is stored in the smart contract. The authentication device approves the business data when the smart contract includes the private data hash.

17 Claims, 5 Drawing Sheets

(51) Int. Cl.
  *G06F 21/64* (2013.01)
  *H04L 9/08* (2006.01)
  *H04L 9/32* (2006.01)

(56) References Cited

U.S. PATENT DOCUMENTS

| | | | |
|---|---|---|---|
| 2020/0193429 A1 | 6/2020 | Babar et al. | |
| 2020/0402031 A1* | 12/2020 | Pira | G06Q 20/108 |
| 2021/0314305 A1 | 10/2021 | Rodriguez | |
| 2023/0104626 A1* | 4/2023 | Luedtke | H04L 1/0041 |
| | | | 714/776 |
| 2023/0130347 A1* | 4/2023 | Ravinathan | G06Q 20/3829 |
| | | | 705/71 |

FOREIGN PATENT DOCUMENTS

| | | |
|---|---|---|
| CN | 106779704 A | 5/2017 |
| TW | M607492 U | 2/2021 |

* cited by examiner

DEVICE AND METHOD FOR SECURING AND VERIFYING BUSINESS DATA VIA A BLOCKCHAIN SYSTEM

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present disclosure relates to a device and a method for securing and verifying business data via a blockchain system. More specifically, the present disclosure relates to a device and a method for securing and verifying business data via a blockchain system that ensure both preserving business evidence and securing the confidentialities of the same.

2. Description of Related Art Including Information Disclosed Under 37 CFR 1.97 and 37 CFR 1.98

Blockchains are commonly used for maintaining business records between two parties thanks to their decentralized and immutable structure, which makes it nearly impossible to falsify the records maintained therein. To utilize a blockchain for preserving business evidence, relevant information (e.g., the value of payment, destination address, and/or other information to be preserved) needs to be provided to all nodes of the blockchain system such that it is kept as a record (i.e., a block) on the blockchain, which means said information has to become public to all of the nodes.

However, there are some circumstances that the business-related information provided to the nodes are considered confidential, that is, the content of which should be only available to certain parties instead of all nodes on the blockchain. Thus, there is an urgent need in the art for a solution capable of preserving business evidence on a blockchain while still ensuring the confidentiality of the same.

BRIEF SUMMARY OF THE INVENTION

To solve at least the abovementioned problem, the present disclosure provides a device for securing business data via a blockchain system. The device may comprise a storage, a transceiver electrically connected with the storage, and a processor electrically connected with the storage and the transceiver. The storage may be configured to store business data and a transaction hash. The processor may be configured to obtain an address of a smart contract in the blockchain system according to the transaction hash, generate a private data hash according to the business data, and generate a transaction based on the private data hash and the address of the smart contract. The transceiver may be configured to submit the transaction to the blockchain system to store the private data hash into the smart contract, such that confidential information of a business deal in the real world is secured by the blockchain system.

To solve at least the abovementioned problem, the present disclosure also provides a device for verifying business data via a blockchain system. The device may comprise a storage, a transceiver electrically connected with the storage, and a processor electrically connected with the storage and the transceiver. The storage may be configured to store business data and a transaction hash. The processor may be configured to generate a private data hash according to the business data and obtain an address of a smart contract in the blockchain system according to the transaction hash. The transceiver may be configured to access the smart contract via the address of the smart contract. Moreover, the processor may be further configured to determine whether the private data hash is comprised in the smart contract, and approve the business data when determining that the private data hash is stored in the smart contract, such that a business deal in the real world is verified by the blockchain system.

To solve at least the abovementioned problem, the present disclosure also provides a method for securing business data via a blockchain system. The method may comprise steps performed by an electronic device in the blockchain system as follows:

obtaining an address of a smart contract in the blockchain system according to a transaction hash;
  generating a private data hash according to business data;
  generating a transaction based on the private data hash and the address of the smart contract; and
  submitting the transaction to the blockchain system to store the private data hash into the smart contract, such that confidential information of a business deal in the real world is secured by the blockchain system.

To solve at least the abovementioned problem, the present disclosure also provides a method for verifying business data via a blockchain system. The method may comprise steps performed by an electronic device in the blockchain system as follows:

generating a private data hash according to business data;
  obtaining an address of a smart contract in the blockchain system according to a transaction hash;
  accessing the smart contract via the address of the smart contract;
  determining whether the private data hash is stored in the smart contract; and
  approving the business data when determining that the private data hash is stored in the smart contract, such that a business deal in the real world is verified by the blockchain system.

The device and method for securing and verifying business data via a blockchain system provided by the present disclosure ensure both preserving business evidence and securing the confidentialities of the same via generating and deploying a hash of the confidential business data to the smart contract. The smart contract and the corresponding block on the blockchain do not exhibit the business data, but a piece of information that is indecipherable based on its content, and the immutable mechanism of the blockchain preserves the index to verify the business data. Therefore, a certain individual or organization is still capable of verifying the business data (i.e., to determine whether a business action/a deal actually took place in the way specified by the business data) whenever necessary, as long as he/she is provided with the business data. In view of this, the device and method for securing and verifying business data via a blockchain system provided by the present disclosure indeed solve the abovementioned problem in the art.

This summary overall describes the core concept of the present invention and covers the problem to be solved, the means to solve the problem and the effect of the present invention to provide a basic understanding of the present invention by those of ordinary skill in the art. However, it shall be appreciated that, this summary is not intended to encompass all embodiments of the present invention but is provided only to present the core concept of the present invention in a simple form and as an introduction to the following detailed description. The detailed technology and preferred embodiments implemented for the subject invention are described in the following paragraphs accompanying the appended drawings for people having ordinary skills in the art to well appreciate the features of the claimed invention.

BRIEF DESCRIPTION OF THE SEVERAL VIEWS OF THE DRAWINGS

The drawings can assist the description of the present disclosure.

DETAILED DESCRIPTION OF THE INVENTION

In the following description, a device and a method for securing business data as well as a device and a method for verifying business data via a blockchain system provided by the present disclosure will be explained with reference to embodiments thereof. However, these embodiments are not intended to limit the present invention to any environment, applications, or implementations described in these embodiments. Therefore, description of these embodiments is only for purpose of illustration rather than to limit the present invention. It should be appreciated that, in the following embodiments and the attached drawings, elements unrelated to the present invention are omitted from depiction. In addition, dimensions of and dimensional scales among individual elements in the attached drawings are provided only for illustration, but not to limit the scope of the present invention.

Figure 1:
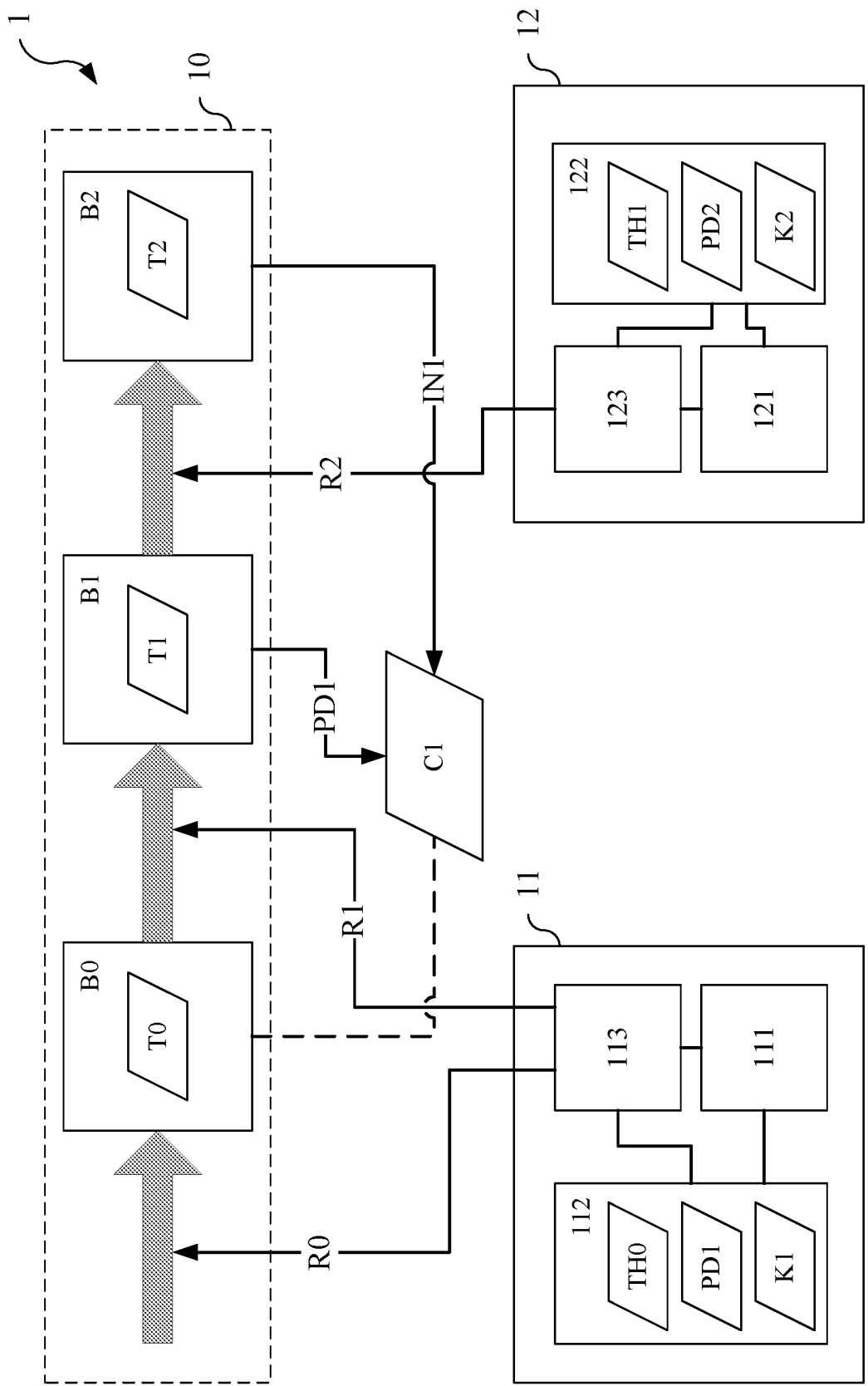
FIG. 1 depicts a schematic view of a blockchain system according to one or more embodiments of the present disclosure.

FIG. 1 depicts a schematic view of a blockchain system according to one or more embodiments of the present disclosure. The contents shown in FIG. 1 are only for easily illustrating the embodiments, instead of limiting the scope of the present disclosure.

Please refer to FIG. 1. A blockchain system 1 may comprise a plurality of nodes which together form a decentralized peer-to-peer (P2P) network structure. The blockchain system 1 may be a network based on for example but not limited to Ethereum or other blockchain platforms that support Solidity, which is an object-oriented programming language widely used for implementing smart contracts.

By way of example, FIG. 1 exhibits two of the plurality of nodes, i.e., electronic devices 11 and 12. Each of the electronic devices 11 and 12 may be a device with general blockchain functionalities (e.g., storing and changing the states of a blockchain virtual machine, creating and issuing a transaction to the blockchain, deploying a smart contract, executing a specific program or function included in a smart contract, initiating and interacting with an account of the blockchain system, etc.) Those having ordinary skills in the art can directly understand the essential data, components, and/or behaviors for implementing said functionalities based on the present disclosure, and thus they will not be specifically described hereinafter.

The electronic device 11 as a whole may be configured for preserving business data with a blockchain 10, and the electronic device 12 as a whole may be configured for verifying business data via the blockchain 10. The electronic device 11 may comprise a processor 111, a storage 112 electrically connected with the processor 111, and a transceiver 113 electrically connected with the processor 111 and the storage 112. Similarly, the electronic device 12 may comprise a processor 121, a storage 122 electrically connected with the processor 121, and a transceiver 123 electrically connected with the processor 121 and the storage 122. It should be noted that the electrical connection between the aforementioned components may be direct (i.e., connected with each other without any functional components therebetween) or indirect (i.e., connected with each other through other functional components).

Each of the processors 111 and 121 may be a microprocessor or microcontroller. A microprocessor or a microcontroller is a programmable special integrated circuit that has the functions of operation, storage, output/input, etc., and can accept and process various coding instructions, thereby performing various logic operations and arithmetic operations, and outputting the corresponding operation result. The processors 111 and 121 may be programmed to execute various instructions to process data in the electronic devices 11 and 12 respectively and execute various operational procedures or programs.

The storages 112 and 122 may be configured to store data generated by the electronic devices 11 and 12 respectively, data transmitted from an external device to the electronic devices, or data input into the electronic devices by a user. Each of the storages 112 and 122 may comprise a first-level memory (also referred to as main memory or internal memory), and the corresponding processor 111 or 121 may directly read instruction sets stored in the first-level memory, and execute these instruction sets if needed. Each of the storages 112 and 122 may comprise a second-level memory (also referred to as external memory or secondary memory), and the second-level memory may transmit the stored data to the first-level memory through the data buffer. For example, the secondary memory may for example be a hard disk, a compact disk, or the like, without being limited thereto. Each of the storages 112 and 122 may comprise a third-level memory (i.e., a storage device that can be inserted into or pulled out from a computer directly (e.g., a mobile disk)).

As shown in FIG. 1, the storage 112 may store business data PD1, and the storage 122 may store business data PD2. Each of the business data PD1 and PD2 may be data related to a business action (e.g., a payment) of a user. Said business action may be a transaction of cryptocurrencies between two accounts of the blockchain system 1, whereas in some embodiments, said business action may also be a transaction of real-world currencies such as USD, RMB, EUR, etc. To be more specific, the business data PD1 and PD2 may comprise information related to, for example, the identity of the participant of a business deal (e.g., the personal ID number, the tax ID number or a registration number of a company, etc.), an invoice, a delivery order, a shipment, a certificate of origin, and/or any other items that are involved in different stages of a business deal. Accordingly, the business data PD1 and PD2 may comprise a text, an image, an audio, a video, and/or any other formats corresponding to the business action. The business data PD1 and PD2 may be served as a proof of trading, and thus are helpful when checking whether a business action actually took place as alleged.

Each of the transceivers 113 and 123 may be configured to perform wired or wireless communication with other devices outside. Taking wireless communication as an example, the transceivers 113 and 123 may comprise, but is not limited to, an antenna, an amplifier, a modulator, a demodulator, a detector, an analog-to-digital converter, a digital-to-analog converter, or other communication elements. Taking wired communication as an example, the transceivers 113 and 123 may be, for example but not limited to, a gigabit Ethernet transceiver, a gigabit Ethernet interface converter (GBIC), a small form-factor pluggable (SFP) transceiver, a ten-gigabit small form-factor pluggable (XFP) transceiver, or the like.

Figure 2:
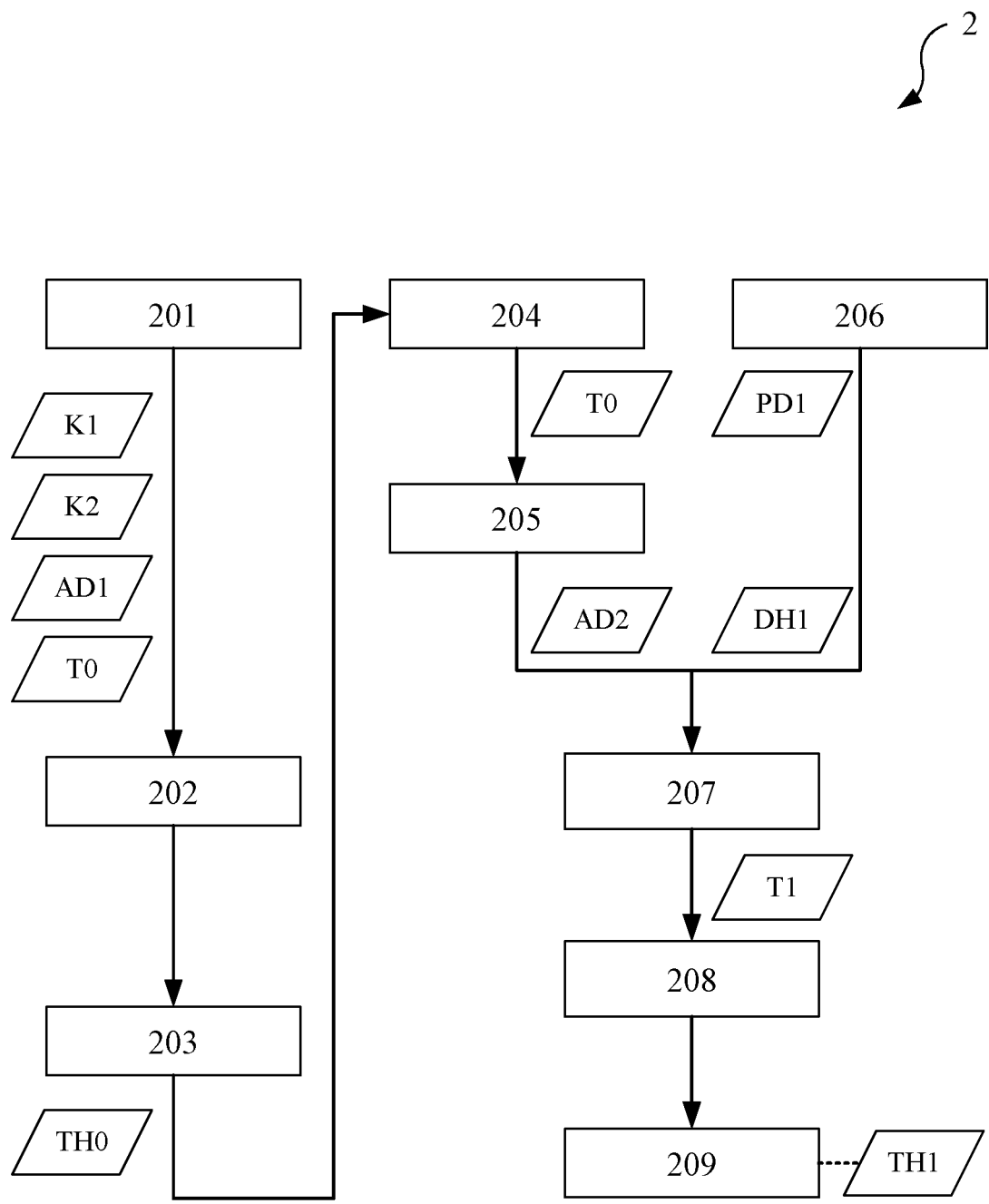
FIG. 2 depicts a schematic view of a process for securing business data according to one or more embodiments of the present disclosure.

FIG. 2 depicts a schematic view of a process for securing business data according to one or more embodiments of the present disclosure. The contents shown in FIG. 2 are only for easily illustrating the embodiments, instead of limiting the scope of the present disclosure.

Please refer to both FIG. 1 and FIG. 2. A process 2 for securing business data may be executed whenever the user wants to preserve the business data PD1 as evidence on the blockchain system 1. Before the beginning of the process 2, the storage 112 may store a private key K1 corresponding to a user account that represents the electronic device 11 in the blockchain system 1, and a public key K2 corresponding to the user account may be generated based on the private key K1. In some embodiments, said public key K2 may be generated by the processor 111. An address AD1 corresponding to the user account in the blockchain system 1 may then be generated based on the public key K2, which, in some embodiments, may also be generated by the processor 111.

The process 2 may begin with an action 201, in which the processor 111 may generate a contract deployment transaction T0 based on the private key K1, the public key K2, and the address AD1 of the user account, so as to deploy a smart contract C1 corresponding to the user account. In an action 202, the processor 111 may sign the contract deployment transaction T0 with the private key K1, and the transceiver 113, in an action 203, may deploy the smart contract C1 by submitting a transaction request R0 to the blockchain system 1. A block B0 comprising the contract deployment transaction T0 may be generated in the blockchain 10 and the transaction hash TH0 representing the contract deployment transaction T0 may be obtained after the transaction request R0 and the corresponding contract deployment transaction T0 have been validated, executed, and committed to the blockchain system 1 by a miner (i.e., one of the nodes) therein. The storage 112 may store the transaction hash TH0.

Note that the smart contract C1 shown in FIG. 1 is only a schematic view instead of a limitation to its quantity or location. Those having ordinary skills in the art shall realize that the smart contract C1 is, in fact, stored within each valid node of the blockchain system 1 after the action 203.

When the user of the electronic device 11 wants to submit evidence of the previously-mentioned business action to the blockchain 10, the transceiver 113, in an action 204, may access the block B0 to reach the contract deployment transaction T0. The processor 111 may then obtain an address AD2 of the smart contract C1 according to the contract deployment transaction T0, which is in an action 205.

On the other hand, in an action 206, the processor 111 may generate a private data hash DH1 according to the business data PD1. The business data PD1 may represent the information that needs to be not only preserved via the blockchain 10 but also kept unavailable for irrelevant users of the blockchain system 1, since its content usually contains the privacy or confidential information of one or more parties involved in the business action. In some embodiments, the processor 111 may generate the private data hash DH1 using an SHA-3 algorithm such as Keccak256. In some embodiments, the action 206 may be performed before any of the actions 201-205.

After obtaining the address AD2 and the private data hash DH1, the processor 111, in an action 207, may generate a transaction T1 for interacting with the smart contract C1 based on the address AD2 and the private data hash DH1, and sign the transaction T1 with the private key K1 in an action 208. Specifically, for example, the address AD2 may be included in a recipient field of the transaction T1, and the private data hash DH1 may be included in a data field of the transaction T1.

The transceiver 113 may then submit (i.e., via broadcasting) a transaction request R1 corresponding to the signed transaction T1 to the blockchain system 1. Once the transaction request R1 has been validated, executed, and committed to the blockchain system 1 by a miner, the private data hash DH1 may be transmitted to the smart contract C1 as an input to set the variables defined therein upon execution, since it has been specified in the transaction T1 that the recipient is the smart contract C1 and the included data is the private data hash DH1. A block B1 comprising the transaction T1 may be generated in the blockchain 10 and a transaction hash TH1 representing the transaction T1 may then be obtained.

More specifically, the smart contract C1 may be initially programmed via the processor 111 to include a function that catches the input value and assigns it to a variable, such that the private data hash DH1 can be stored therein upon execution via the transaction T1.

With the process 2 for securing business data, the private data hash DH1 can be successfully stored in the smart contract C1 as a link to the business data PD1. Any valid node in the blockchain system 1 can observe the record of the private data hash DH1, but cannot derive the content of the business data PD1 simply by view of the private data hash DH1.

In some embodiments, the processor 111 may alternatively program and deploy the smart contract C1 as an upgradable smart contract (e.g., by deploying a proxy smart contract, or directly using tools such as "deployProxy" provided by OpenZeppelin). The smart contract C1 may therefore be upgraded based on the private data hash DH1 via the transaction T1.

Figure 3:
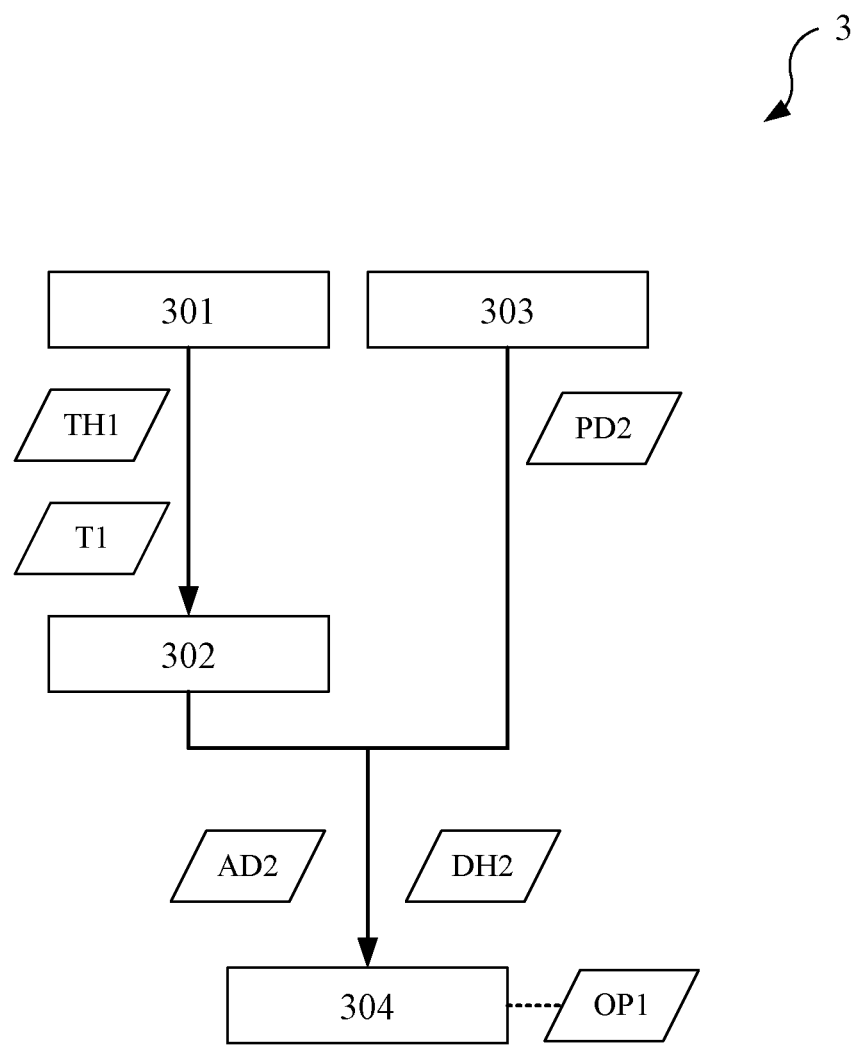
FIG. 3 depicts a schematic view of a process for verifying business data according to one or more embodiments of the present disclosure.

FIG. 3 depicts a schematic view of a process for verifying business data according to one or more embodiments of the present disclosure. The contents shown in FIG. 3 are only for easily illustrating the embodiments, instead of limiting the scope of the present disclosure.

Please refer to FIG. 1, FIG. 2, and FIG. 3 together. When any individual wants to prove that the business action corresponding to the business data PD2 is the exact business action corresponding to the business data PD1, he/she may provide the transaction hash TH1 and the business data PD2 to the electronic device 12 via, for example, the transceiver 123 or other input means. A process 3 for verifying business data may be executed by the electronic device 12 following the process 2 to verify whether the business data PD2 is consistent with the business data PD1. Note that the electronic device 12 may be different with the electronic device 11, and thus may have zero knowledge about the business data PD1 since it is kept exclusive to the electronic device 11. However, the verification mechanism provided by the present disclosure in the process 3 does not require the electronic device 12 to know the content of the business data PD1.

The process 3 may begin with an action 301, in which the processor 121 may reach/visit the transaction T1 according to the transaction hash TH1. The processor 121 in an action 302 may then obtain the address AD2 of the smart contract C1 from the transaction T1. On the other hand, the processor 121 in an action 303 may generate a private data hash DH2 according to the business data PD2 in the same way as the processor 111 generates the private data hash DH1. In some embodiments, the action 303 may be performed before the action 301 or the action 302.

After obtaining the address AD2 and the private data hash DH2, the processor 121, in an action 304, may determine whether the private data hash DH2 is comprised in the smart contract C1 (the existence of the private data hash DH2 indicates that the business data PD2 is the exact business data that was used for generating the transaction T1 and constructing the block B1). The processor 121 may approve the business data PD2 when determining that the private data hash DH2 is comprised in the smart contract C1 since it is almost impossible that the business data PD1 and PD2 would result in the same hash value via the same hashing mechanism if the two data are not identical. On the other hand, the business data PD2 may be disapproved by the processor 121 upon determining that the private data hash DH2 is not comprised in the smart contract C1. It can thus be concluded that the approval/disapproval of business data PD2 may represent the fact that the two pieces of business data PD1 and PD2 are identical/different.

In some embodiments, regarding the action 304, the processor 121 may first generate a transaction T2 for interacting with the smart contract C1 based on the address AD2 and the private data hash DH2, and sign the transaction T2 with the private key of the corresponding user account of the electronic device 12. The transceiver 123 may then submit a transaction request R2 corresponding to the signed transaction T2 to the blockchain system 1.

Once the transaction request R2 has been validated, executed, and committed to the blockchain system 1 by a miner, the private data hash DH2 may be transmitted to the smart contract C1 as an input. The smart contract C1 may then be executed by the processor 121, and certain functions (e.g., an inquiry/search function) in the smart contract C1 may be called for checking the existence of the private data hash DH2 and provide an output message OP1 indicating the result (i.e., whether the private data hash DH2 is comprised in the smart contract C1). Consequently, a block B2 comprising the transaction T2 may be generated in the blockchain 10 and a transaction hash TH2 representing the transaction T2 may then be obtained.

To achieve such operations as mentioned above, the smart contract C1 may, for example, include a function that catches the input value (e.g., the private data hash DH2) and compares it with a variable (designed for storing the private data hash DH1 as previously explained) defined in the same or different function. However, the way for the smart contract C1 to check the existence of the private data hash DH2 therein is not limited to such an implementation.

In some embodiments, each of the business data PD1 and PD2 may be processed to a JSON file before being further processed to the private data hash DH1 or DH2.

In some embodiments, the processor 121 may determine whether the transaction hash TH1 was generated based on a private key corresponding to a user account of the blockchain system. Specifically, for example, the storage 122 may further store a public key (e.g., the public key K2) corresponding to a certain user account (e.g., the user of the electronic device 11), and the processor 121 may authenticate the transaction hash TH1 with the public key to determine whether the transaction hash TH1 was generated based on the private key (e.g., the private key K1) of that user. The processor 121 may approve the business data PD2 only when determining both that the transaction hash TH1 was generated based on the certain private key and that the private data hash DH2 is comprised in the smart contract C1.

Figure 4:
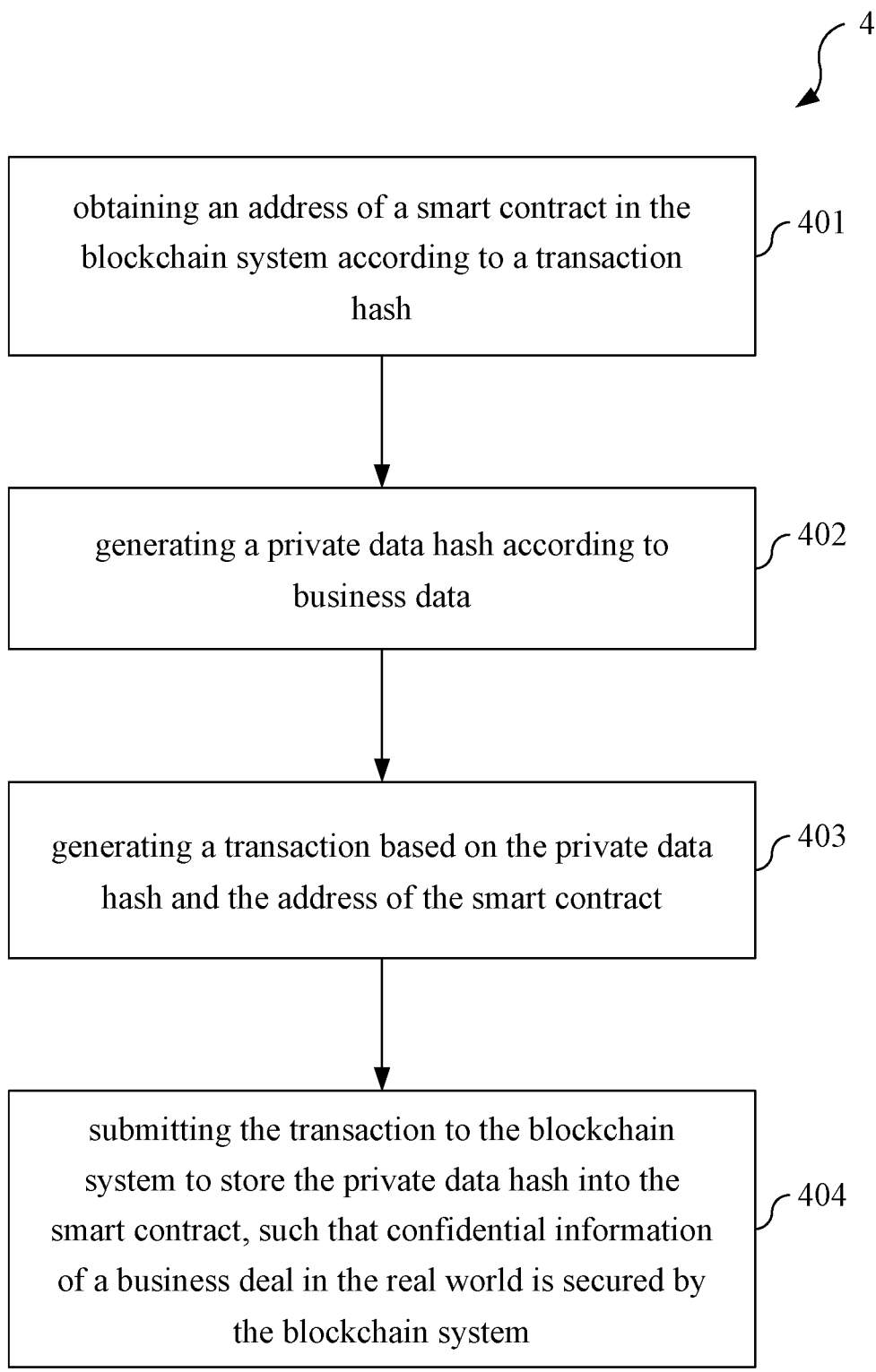
FIG. 4 depicts a schematic view of a method for securing business data via a blockchain system according to one or more embodiments of the present disclosure.

FIG. 4 depicts a method for securing business data via a blockchain system according to one or more embodiments of the present disclosure. The contents shown in FIG. 4 are only for easily illustrating the embodiment of the present disclosure, instead of limiting the scope of the present disclosure.

Please refer to FIG. 4. A method 4 for securing business data via a blockchain system may comprise steps performed by an electronic device in the blockchain system as follows:
  obtaining an address of a smart contract in the blockchain system according to a transaction hash (labeled as a step 401);
  generating a private data hash according to business data (labeled as a step 402);
  generating a transaction based on the private data hash and the address of the smart contract (labeled as a step 403); and
  submitting the transaction to the blockchain system to store the private data hash into the smart contract, such that confidential information of a business deal in the real world is secured by the blockchain system (labeled as a step 404).

In some embodiments, the smart contract may correspond to a user account of the blockchain system, and the method 4 may further comprise a step as follows: signing the transaction with a private key of the user account before submitting the transaction to the blockchain system.

In some embodiments, regarding the method 4, the smart contract may correspond to a user account of the blockchain system, and the method 4 may further comprise steps as follows: generating, by the electronic device, a public key of the user account based on a private key of the user account; generating, by the electronic device, an address of the user account in the blockchain system based on the public key; generating, by the electronic device, a contract deployment transaction based on the private key, the public key, and the address of the user account; and deploying, by the electronic device, the smart contract by submitting the contract deployment transaction to the blockchain system to obtain the transaction hash. Moreover, in some embodiments, the method 4 may further comprise a step as follows: signing the contract deployment transaction with the private key before submitting the contract deployment transaction to the blockchain system.

In some embodiments, regarding the method 4, the electronic device may generate the private data hash of the business data based on an SHA-3 algorithm. Also in some embodiments, the business data may comprise at least one of a text, an image, an audio, and a video corresponding to the business deal.

Figure 5:
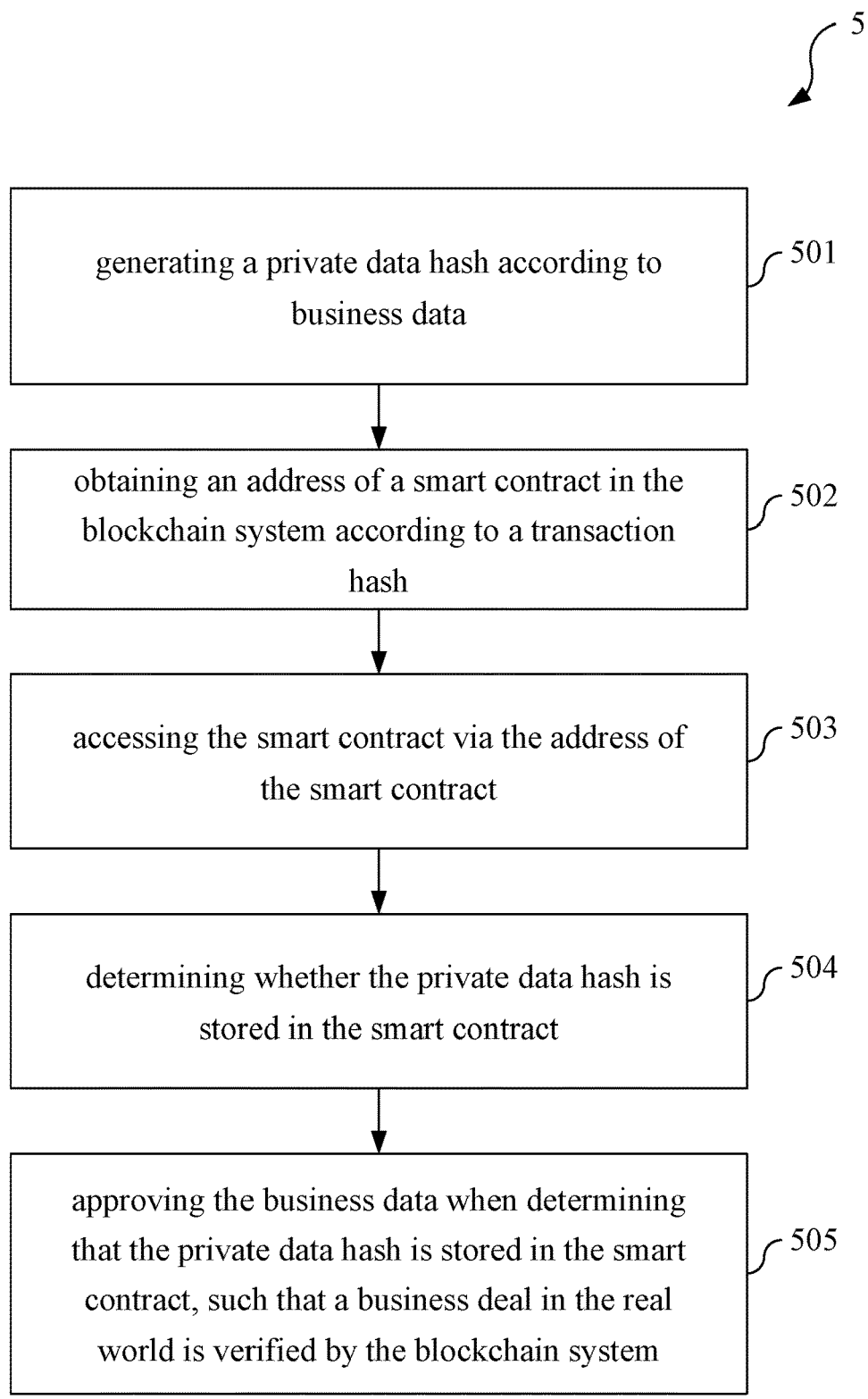
FIG. 5 depicts a schematic view of a method for verifying business data via a blockchain system according to one or more embodiments of the present disclosure.

FIG. 5 depicts a method for verifying business data via a blockchain system according to one or more embodiments of the present disclosure. The contents shown in FIG. 5 are only for easily illustrating the embodiment of the present disclosure, instead of limiting the scope of the present disclosure.

Please refer to FIG. 5. A method 5 for verifying business data via a blockchain system may comprise steps performed by an electronic device in the blockchain system as follows:
- generating a private data hash according to business data (labeled as a step 501);
- obtaining an address of a smart contract in the blockchain system according to a transaction hash (labeled as a step 502);
- accessing the smart contract via the address of the smart contract (labeled as a step 503);
- determining whether the private data hash is stored in the smart contract (labeled as a step 504); and
- approving the business data when determining that the private data hash is stored in the smart contract, such that a business deal in the real world is verified by the blockchain system (labeled as a step 505).

In some embodiments, the method 5 may further comprise a step as follows: determining whether the transaction hash was generated based on a private key corresponding to a user account of the blockchain system. The electronic device may approve the business data when determining both that the transaction hash was generated based on the private key and that the private data hash is comprised in the smart contract. Moreover, in some embodiments, the electronic device may determine whether the transaction hash was generated based on the private key by authenticating the transaction hash with a public key corresponding to the user account.

In some embodiments, regarding the method 5, the electronic device may generate the private data hash based on an SHA-3 algorithm. Moreover, in some embodiments, the business data may comprise at least one of a text, an image, an audio, and a video corresponding to the business deal.

Each embodiment of the methods 4 and 5 basically corresponds to a certain embodiment of the electronic device 11 or the electronic device 12 of the blockchain system 1. Therefore, those of ordinary skill in the art may fully understand and implement all the corresponding embodiments of the methods 4 and 5 simply by referring to the above descriptions of the electronic device 11 or the electronic device 12 of the blockchain system 1, even though not all of the embodiments of the methods 4 and 5 are described in detail above.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

We claim:

1. A device for securing business data via a blockchain system, the device comprising:
   - a storage means being configured to store business data and a transaction hash;
   - a transceiver electrically connected with the storage means; and
   - a processor electrically connected with the storage means and the transceiver, being configured to:
     - obtain an address of a smart contract in the blockchain system according to the transaction hash;
     - generate a private data hash according to the business data; and
     - generate a transaction based on the private data hash and the address of the smart contract;
   - wherein the transceiver is configured to submit the transaction to the blockchain system to store the private data hash into the smart contract, such that confidential information of a business deal in the real world is secured by the blockchain system.

2. The device of claim 1, wherein the smart contract corresponds to a user account of the blockchain system,
   - wherein the storage is further configured to store a private key of the user account, and
   - wherein the processor is further configured to sign the transaction with the private key before submitting the transaction to the blockchain system.

3. The device of claim 1, wherein:
   - the smart contract corresponds to a user account of the blockchain system;
   - wherein the storage is further configured to store a private key of the user account;
   - wherein the processor is further configured to:
     - generate a public key of the user account based on the private key;
     - generate an address of the user account in the blockchain system based on the public key; and
     - generate a contract deployment transaction based on the private key, the public key, and the address of the user account; and
   - wherein the transceiver is further configured to deploy the smart contract by submitting the contract deployment transaction to the blockchain system to obtain the transaction hash.

4. The device of claim 3, wherein the processor is further configured to sign the contract deployment transaction with the private key before submitting the contract deployment transaction to the blockchain system.

5. The device of claim 1, wherein the processor generates the private data hash of the business data based on an SHA-3 algorithm.

6. The device of claim 1, wherein the business data comprises at least one of group consisting of: a text, an image, an audio, and a video corresponding to the business deal.

7. A device for verifying business data via a blockchain system, comprising:
a storage means, being configured to store business data and a transaction hash;
a transceiver electrically connected with the storage means; and
a processor electrically connected with the storage means and the transceiver, being configured to:
generate a private data hash according to the business data; and
obtain an address of a smart contract in the blockchain system according to the transaction hash;
wherein the transceiver is configured to access the smart contract via the address of the smart contract, and
wherein the processor is further configured to:
determine whether the private data hash is comprised in the smart contract; and
approve the business data when determining that the private data hash is stored in the smart contract, such that a business deal in the real world is verified by the blockchain system.

8. The device of claim 7, wherein the processor is further configured to determine whether the transaction hash was generated based on a private key corresponding to a user account of the blockchain system, and
wherein the processor approves the business data when determining both that the transaction hash was generated based on the private key and that the private data hash is comprised in the smart contract.

9. The device of claim 8, wherein the storage is further configured to store a public key corresponding to the user account, and
wherein the processor is further configured to authenticate the transaction hash with the public key to determine whether the transaction hash was generated based on the private key.

10. The device of claim 7, wherein the processor generates the private data hash based on an SHA-3 algorithm.

11. The device of claim 7, wherein the business data comprises at least one of a group consisting of: a text, an image, an audio, and a video corresponding to the business deal.

12. A method for securing business data via a blockchain system, the method comprising steps of:
obtaining an address of a smart contract in the blockchain system according to a transaction hash with an electronic device in the blockchain system;
generating a private data hash according to business data;
generating a transaction based on the private data hash and the address of the smart contract; and
submitting the transaction to the blockchain system to store the private data hash into the smart contract, such that confidential information of a business deal in the real world is secured by the blockchain system.

13. The method of claim 12, wherein the smart contract corresponds to a user account of the blockchain system, and
wherein the method further comprises the step of: signing the transaction with a private key of the user account before submitting the transaction to the blockchain system.

14. The method of claim 12, wherein the smart contract corresponds to a user account of the blockchain system, and
wherein the method further comprises the steps of:
generating a public key of the user account based on a private key of the user account;
generating an address of the user account in the blockchain system based on the public key;
generating a contract deployment transaction based on the private key, the public key, and the address of the user account; and
deploying the smart contract by submitting the contract deployment transaction to the blockchain system to obtain the transaction hash.

15. The method of claim 14, further comprising the step of: signing the contract deployment transaction with the private key before submitting the contract deployment transaction to the blockchain system.

16. The method of claim 12, wherein the electronic device generates the private data hash of the business data based on an SHA-3 algorithm.

17. The method of claim 12, wherein the business data comprises at least one of a text, an image, an audio, and a video corresponding to the business deal.

* * * * *